United States Patent
Watanabe et al.

(10) Patent No.: US 11,028,908 B2
(45) Date of Patent: Jun. 8, 2021

(54) TENSIONER AND RELIEF VALVE UNIT

(71) Applicant: TSUBAKIMOTO CHAIN CO., Osaka (JP)

(72) Inventors: Masanori Watanabe, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 303 days.

(21) Appl. No.: 16/161,384

(22) Filed: Oct. 16, 2018

(65) Prior Publication Data

US 2019/0120343 A1    Apr. 25, 2019

(30) Foreign Application Priority Data

Oct. 20, 2017  (JP) .............................. JP2017-203887

(51) Int. Cl.
 *F16H 7/08*    (2006.01)

(52) U.S. Cl.
 CPC ......... *F16H 7/0848* (2013.01); *F16H 7/0836* (2013.01); *F16H 2007/0806* (2013.01); *F16H 2007/0808* (2013.01); *F16H 2007/0812* (2013.01); *F16H 2007/0814* (2013.01); *F16H 2007/0853* (2013.01); *F16H 2007/0859* (2013.01)

(58) Field of Classification Search
 CPC ........ F16H 7/08; F16H 7/0848; F16H 7/0836; F16H 2007/0812; F16H 2007/0814; F16H 2007/0853; F16H 2007/0859; F16H 2007/0806; F16H 2007/0808

See application file for complete search history.

(56) References Cited

U.S. PATENT DOCUMENTS

| | | | | | |
|---|---|---|---|---|---|
| 5,700,213 | A | * | 12/1997 | Simpson | ............... F16H 7/0848 474/110 |
| 5,707,309 | A | * | 1/1998 | Simpson | ................... F16H 7/08 474/110 |
| 8,585,519 | B2 | * | 11/2013 | Hartmann | ............. F16H 7/0836 474/110 |

(Continued)

FOREIGN PATENT DOCUMENTS

| | | |
|---|---|---|
| JP | 2002-130401 A | 5/2002 |
| JP | 2002-235818 A | 8/2002 |

(Continued)

*Primary Examiner* — Michael R Mansen
*Assistant Examiner* — Raveen J Dias
(74) *Attorney, Agent, or Firm* — Westerman, Hattori, Daniels & Adrian, LLP (57) ABSTRACT

To provide a tensioner and a relief valve unit that enable a reduction in the number of parts to be processed and the number of assembling steps, reduce the amount of oil flowing out to the outside, prevent damage to the check valve, and improve the oil recovery rate. The relief valve unit that releases oil when pressure inside an oil pressure chamber reaches or exceeds a predetermined high pressure includes a check valve unit that stops reverse flow of oil flowing into the oil pressure chamber as a valve element, the check valve unit being slidably inserted in the relief valve unit. The relief valve unit includes a unit pressing spring that presses the check valve unit toward a relief valve seat. The check valve unit includes an oil passage for allowing oil to flow between an inner side and an outer side of the check valve unit.

4 Claims, 7 Drawing Sheets

(56) References Cited

U.S. PATENT DOCUMENTS

| | | |
|---|---|---|
| 10,781,892 B2 * | 9/2020 | Cobb ................... F01L 1/022 |
| 2002/0052259 A1 | 5/2002 | Nakakubo et al. |
| 2002/0169042 A1 | 11/2002 | Kurohata et al. |
| 2006/0089221 A1 | 4/2006 | Hashimoto et al. |
| 2009/0197722 A1 * | 8/2009 | Emizu ................ F16H 7/0836 474/110 |
| 2016/0186838 A1 | 6/2016 | Kurematsu |
| 2016/0290447 A1 | 10/2016 | Kunimatsu et al. |
| 2017/0130807 A1 * | 5/2017 | Kurematsu ........... F16H 7/0848 |
| 2017/0138443 A1 * | 5/2017 | Kurematsu ........... F16H 7/0838 |
| 2017/0138444 A1 * | 5/2017 | Kurematsu ........... F16H 7/0848 |
| 2018/0180191 A1 | 6/2018 | Shinoyama |
| 2018/0274638 A1 * | 9/2018 | Watanabe ............. F16H 7/0848 |
| 2018/0313434 A1 * | 11/2018 | Watanabe ................. F16H 7/08 |
| 2019/0257391 A1 * | 8/2019 | Watanabe ................. F16H 7/08 |
| 2020/0149614 A1 * | 5/2020 | Okada ..................... F16H 7/08 |
| 2020/0256433 A1 * | 8/2020 | Okada ..................... F16H 7/08 |

FOREIGN PATENT DOCUMENTS

| | | |
|---|---|---|
| JP | 2002-327810 A | 11/2002 |
| JP | 2006-125430 A | 5/2006 |
| JP | 2011-226534 A | 11/2011 |
| JP | 2016-121721 A | 7/2016 |
| JP | 2017-015107 A | 1/2017 |
| KR | 10-2016-0118934 A | 10/2016 |

\* cited by examiner

RELATED ART

Fig. 7

RELATED ART

TENSIONER AND RELIEF VALVE UNIT

BACKGROUND OF THE INVENTION

1. Field of the Invention

The present invention relates to a tensioner that maintains appropriate tension of a chain or the like and includes a tensioner body having a cylindrical plunger bore with an open end, a cylindrical plunger slidably inserted in the plunger bore, and a biasing means that is accommodated inside an oil pressure chamber formed inside the plunger such as to freely expand and contract, and that biases the plunger outward.

2. Description of the Related Art

It has been common practice to use a tensioner for maintaining appropriate tension of a chain or the like. For example, a chain guide mechanism has been known, which slidably guides, by means of a guide shoe, a drive chain such as an endless roller chain passing over respective sprockets of a crankshaft and a cam shaft inside an engine room, and which uses a tensioner to press a pivoting chain guide having the guide shoe to maintain appropriate tension.

Figure 6:
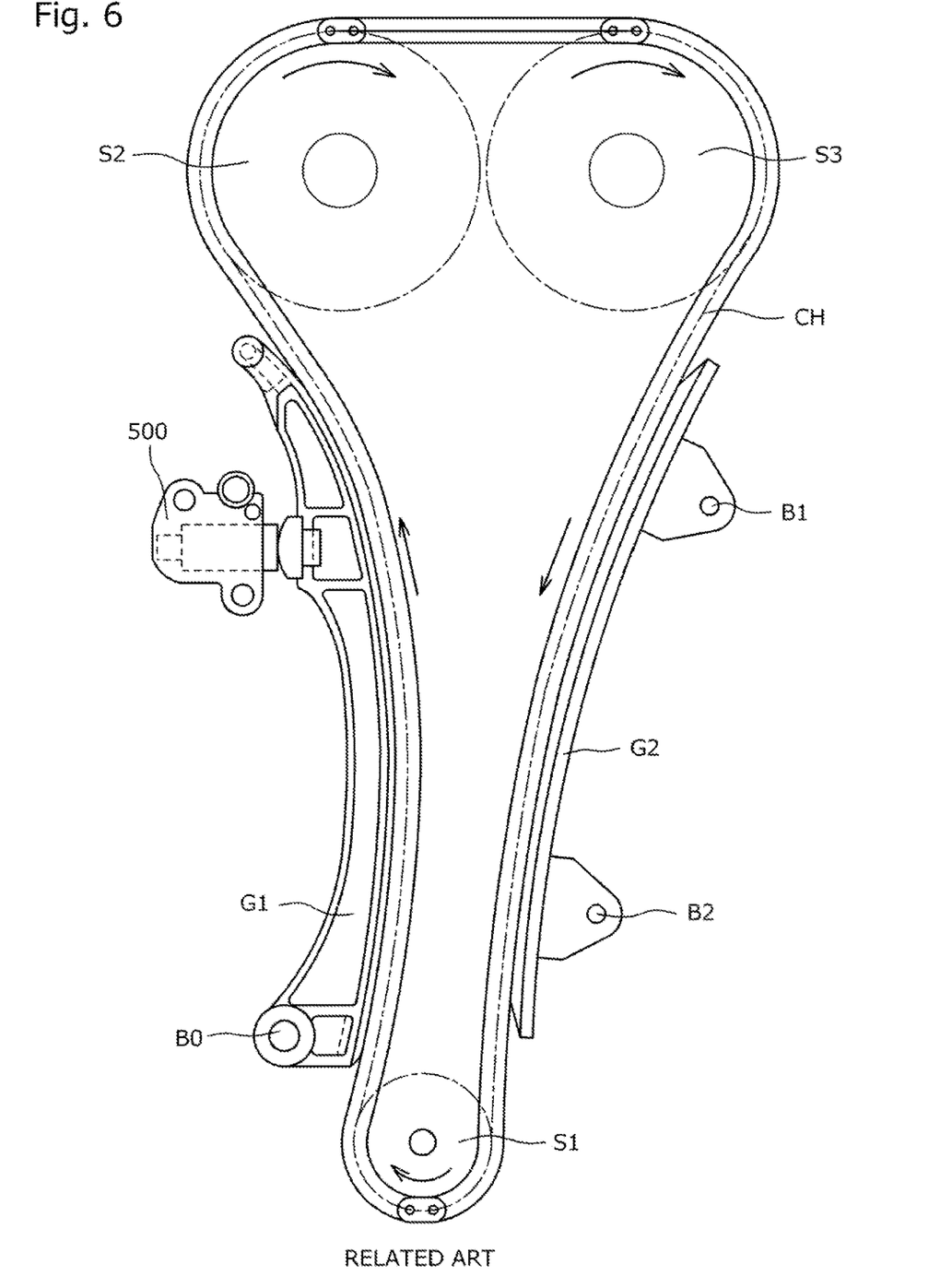
FIG. 6 is an illustrative diagram of the tensioner used in a chain guide mechanism of an engine.

A chain guide mechanism is configured as shown in FIG. 6, for example, wherein a pivoting chain guide G1 and a fixed chain guide G2 guide an endless timing chain CH passing over a drive sprocket S1 of a crankshaft and a pair of driven sprockets S2 and S3 of cam shafts inside an engine room.

The fixed chain guide G2 is fixed in position in the engine room with two mounting shafts B1 and B2, while the pivoting chain guide G1 is attached in the engine room such as to be pivotable around a mounting shaft B0 in the plane in which the timing chain CH runs.

A tensioner 500 presses the pivoting chain guide G1 and thereby maintains the tension of the timing chain CH at an appropriate level as well as reduces its vibration.

Figure 7:
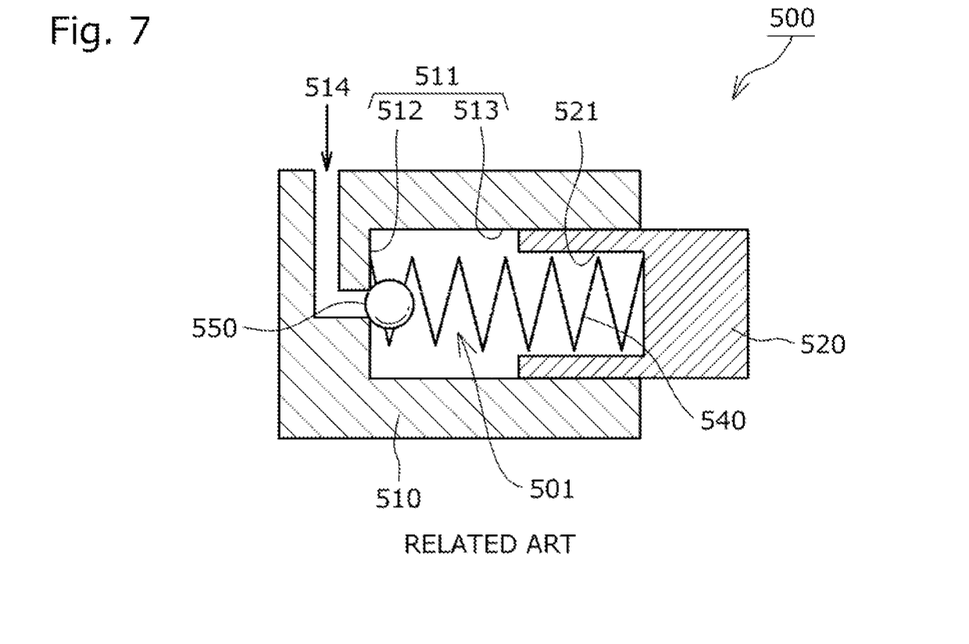
FIG. 7 is a schematic illustrative diagram of a conventional tensioner.

The known tensioner 500 used in such a chain guide mechanism includes, for example, as shown schematically in FIG. 7, a tensioner body 510 having a cylindrical plunger bore 511 with an open end, a cylindrical plunger 520 inserted in the plunger bore 511 to freely slide against a cylindrical surface 513 of the plunger bore 511, and a biasing means that biases the plunger 520 from the plunger bore 511 outward.

The biasing means is formed by a coil spring 540 accommodated inside a cylindrical recess 521 in the cylindrical plunger 520 and compressed between the plunger and a bottom part 512 of the plunger bore 511.

Oil is supplied from an oil supply hole 514 formed in the plunger bore 511, so that an oil pressure chamber 501 formed between the plunger bore 511 and the plunger 520 is filled with the oil. The plunger 520 is pushed outward by this oil. A check valve 550 (schematically shown as a check ball) stops the oil from flowing out from the oil supply hole 514.

As the plunger 520 reciprocates, the oil flows through a small gap between the plunger 520 and the plunger bore 511, and the flow resistance provides the damping effect of slowing down the reciprocal movement of the plunger 520.

In such a tensioner, in the event of an excessive tension developed in the timing chain during use, the pressure in the oil pressure chamber may become too high, which could generate noise or vibration, or cause damage to the timing chain.

To prevent such a situation, tensioners provided with a relief valve for releasing pressure when the pressure of the oil pressure chamber reaches or exceeds a predetermined limit have been known (see Japanese Patent Application Laid-open Nos. 2002-327810, 2011-226534, 2002-130401, 2002-235818, 2006-125430, etc.).

The tensioners known from Japanese Patent Application Laid-open Nos. 2002-327810 and 2011-226534, etc. have their relief valve provided to the tensioner body via an additional oil passage and not disposed inside the plunger bore. Therefore, the tensioners themselves are increased in size, and so are the number of parts to be processed and the number of assembling steps.

The tensioners known from Japanese Patent Application Laid-open Nos. 2002-130401, 2002-235818, 2006-125430, etc. have their relief valve disposed inside the plunger and so a size increase of the tensioners themselves is avoided. On the other hand, the internal structure of the plunger is more complex and the number of assembling steps is increased.

Another problem is that, since the oil released by the relief valve flows out to the outside, more oil is consumed, and accordingly the oil pump performance needs to be enhanced.

Moreover, in known tensioners including those of Japanese Patent Application Laid-open Nos. 2002-327810, 2011-226534, 2002-130401, 2002-235818, 2006-125430, etc., the check valve is configured such that the check ball moves inside the check valve. Therefore, in an operating condition wherein the pressure inside the oil pressure chamber rises suddenly, the check ball sits on the check valve seat with a large impact immediately before the relief valve releases the pressure, because of which there was a possibility that the check valve function could be deteriorated due to damage to the check ball or check valve seat.

To solve these problems, the applicants have proposed a tensioner wherein a check valve unit is disposed as a valve element of a relief valve unit, i.e., the relief valve unit and check valve unit are formed integrally (see Japanese Patent Application Laid-open No. 2016-121721).

SUMMARY OF THE INVENTION

The tensioner of Japanese Patent Application Laid-open No. 2016-121721 provides particular advantages such as enabling a reduction in the number of parts to be processed and the number of assembling steps, reducing the amount of oil flowing out to the outside, and preventing damage to the check valve, without having to increase the size of the tensioner.

Another advantage is that oil consumption is low, because the oil that is released from the oil pressure chamber when the relief valve is opened due to a rapid buildup of pressure inside the oil pressure chamber is recovered from around the relief valve unit to the supply side.

However, since the oil that flows out of the relief valve unit is recovered back into the unit from the other end of the relief valve unit, the route by which the oil travels to reach the check ball is long, because of which the oil could not be fully recovered due to flow resistance.

This problem was evident in tensioners with a relief valve unit having a large total length such as the one shown in FIG. 4 of Japanese Patent Application Laid-open No. 2016-121721.

It would be possible to provide a hole in a side face of a relief sleeve to allow oil to flow from outside to inside. While this can slightly reduce the flow resistance, the unit pressing spring present inside the relief sleeve was one cause of increasing the flow resistance.

The unit pressing spring, in particular, is required of applying a large pressure so that the valve does not open in the normal range of pressure inside the oil pressure chamber. Since the spring is compressed by a small amount corresponding to the opening stroke of the relief valve, it is usually a tightly wound coil spring, so that it was difficult to make the flow resistance smaller to enable full recovery of oil.

An object of the present invention is to solve these problems and provide a tensioner and a relief valve unit that enable a reduction in the number of parts to be processed and the number of assembling steps, reduce the amount of oil flowing out to the outside, prevent damage to the check valve, and improve the oil recovery rate, without having to increase the size of the tensioner.

The present invention achieves the object above by providing a tensioner including a tensioner body having a cylindrical plunger bore with an open end, a cylindrical plunger slidably inserted in the plunger bore, a biasing means that is accommodated inside an oil pressure chamber formed inside the plunger such as to freely expand and contract, and that biases the plunger outward, a check valve unit that stops reverse flow of oil flowing into the oil pressure chamber, and a relief valve unit that releases oil when pressure inside the oil pressure chamber reaches or exceeds a predetermined high pressure. The check valve unit is disposed as a valve element of the relief valve unit. The relief valve unit includes a relief sleeve in which the check valve unit is slidably inserted, a relief valve seat that opens and closes as the check valve unit slides, and a unit pressing spring that presses the check valve unit toward the relief valve seat. The check valve unit includes an oil passage for allowing oil to flow from an outer side to an inner side of the check valve.

The present invention achieves the object above by providing a relief valve unit that is incorporated in a tensioner and includes a relief sleeve in which a check valve unit is slidably inserted, a relief valve seat that opens and closes as the check valve unit slides, and a unit pressing spring that presses the check valve unit toward the relief valve seat. The check valve unit includes an oil passage for allowing oil to flow between an inner side and an outer side of the check valve unit.

In the tensioner according to claim 1 and relief valve unit according to claim 4, the check valve unit is disposed as a valve element of the relief valve unit, and the relief valve unit and the check valve unit are formed integral with each other, so that the size of the tensioner is not increased, nor is the number of parts to be processed.

Since the check valve unit is disposed as a valve element of the relief valve unit, and the relief valve unit and the check valve unit are formed integral with each other, they can be assembled in one piece into the tensioner after the relief valve unit is assembled in advance. Thus, the number of assembling steps can be reduced.

The relief valve unit includes a relief sleeve in which the check valve unit is slidably inserted, a relief valve seat that opens and closes as the check valve unit slides, and a unit pressing spring that presses the check valve unit toward the relief valve seat. Therefore, in an operating condition wherein the pressure inside the oil pressure chamber rises suddenly, the check valve seat moves at the moment when the check ball sits on the check valve seat and the impact is absorbed by the unit pressing mechanism. Damage to the check ball or the check valve seat is thus prevented, and deterioration of the check valve function can be prevented.

Also, the tensioner is configured such that the pressure is relieved by the relief valve unit toward the side from which oil is supplied, so that the amount of oil flowing out to the outside can be reduced, and, since the pressure difference between the oil pressure chamber and the pressure relief side is smaller, the speed at which the relief valve unit returns to its closed state can be increased.

Moreover, even when the relief valve unit is activated before the oil supply is started, such as when starting the engine, the oil is circulated rather than flowing out to the outside because of the structure in which the pressure is relieved toward the side from which oil is supplied, and therefore, rattling at the start of the engine can be reduced.

The check valve unit includes an oil passage that allows oil to flow between an inner side and an outer side of the check valve unit. Thus the route by which the released oil travels to reach the check ball is made short, which reduces factors that cause an increase in flow resistance, so that the oil recovery rate can be improved.

According to the configuration set forth in claim 2 and claim 5, the oil passage includes an oil passage groove radially formed in an end face of the check valve unit on the unit pressing spring side. This way, the oil passage can be formed as close to the relief valve unit as possible, so that the oil recovery rate can be improved even more.

According to the configuration set forth in claim 3 and claim 6, the relief valve unit includes a sleeve communication hole that allows oil to flow between outer sides of the relief valve unit and the check valve unit. This way, the oil released to the outer circumference of the relief valve unit can be readily recovered into the oil passage, so that the oil recovery rate can be improved even more.

DESCRIPTION OF THE PREFERRED EMBODIMENTS

Embodiment 1

A tensioner 100 and a relief valve unit 160 according to one embodiment of the present invention will be described with reference to the drawings.

Figure 1:
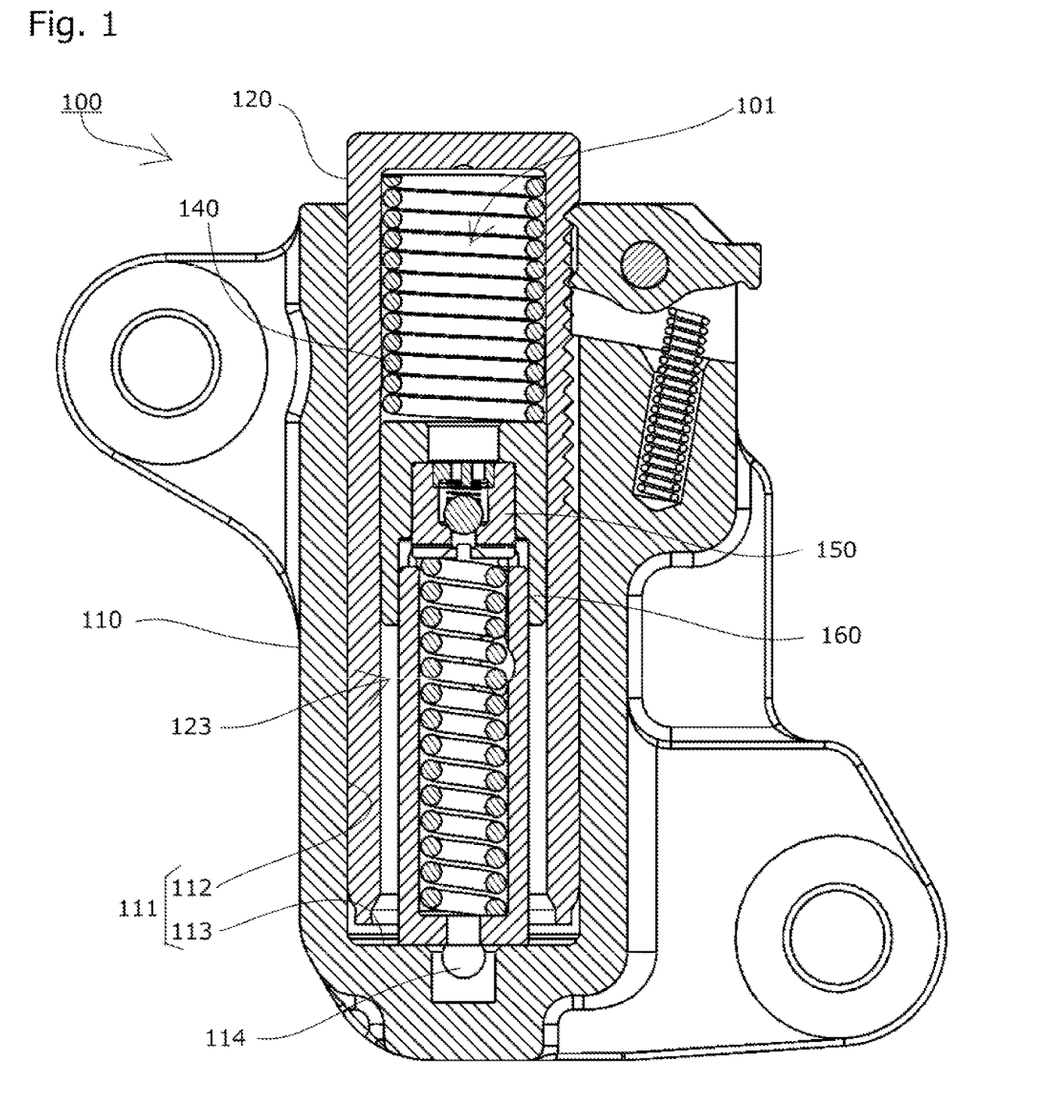
FIG. 1 is a cross-sectional view of a tensioner according to one embodiment of the present invention.

The tensioner 100 according to one embodiment of the present invention includes, as shown in FIG. 1, a tensioner body 110 having a cylindrical plunger bore 111 with an open end, a cylindrical plunger 120 slidably inserted in the plunger bore 111, and a coil spring 140, which is a biasing means that is accommodated inside an oil pressure chamber 101 formed inside the plunger 120 such as to freely expand and contract, and that biases the plunger 120 outward.

A relief valve unit 160 is disposed inside the plunger bore 111 of the tensioner body 110 such as to be slidable inserted in the plunger 120 from a bottom part 113 with a relief valve seat 162 being oriented toward the protruding direction of the plunger 120. The relief valve unit 160 is provided in the bottom part 113. An oil supply hole 114 is formed in the bottom part 113.

Thus the oil pressure chamber 101 is formed inside the plunger 120 on the side toward which the plunger moves out, while an oil reservoir chamber 123 is formed in the bottom part 113 of the plunger bore 111 by an oil reservoir space formed inside and outside of a relief sleeve 161 of the relief valve unit 160.

The tensioner 100 according to this embodiment is a type known as a ratchet tensioner, which includes a ratchet portion on an outer circumferential surface of the plunger 120. This ratchet portion engages with a pawl pivotably attached to the tensioner body 110 in a cut-off portion of the cylindrical surface 112, thereby to restrict the protruding and retracting movement of the plunger 120.

This ratchet mechanism may have any known structure and operate as known, and the tensioner need not necessarily be a ratchet type, and so it will not be described in detail.

Figure 2:
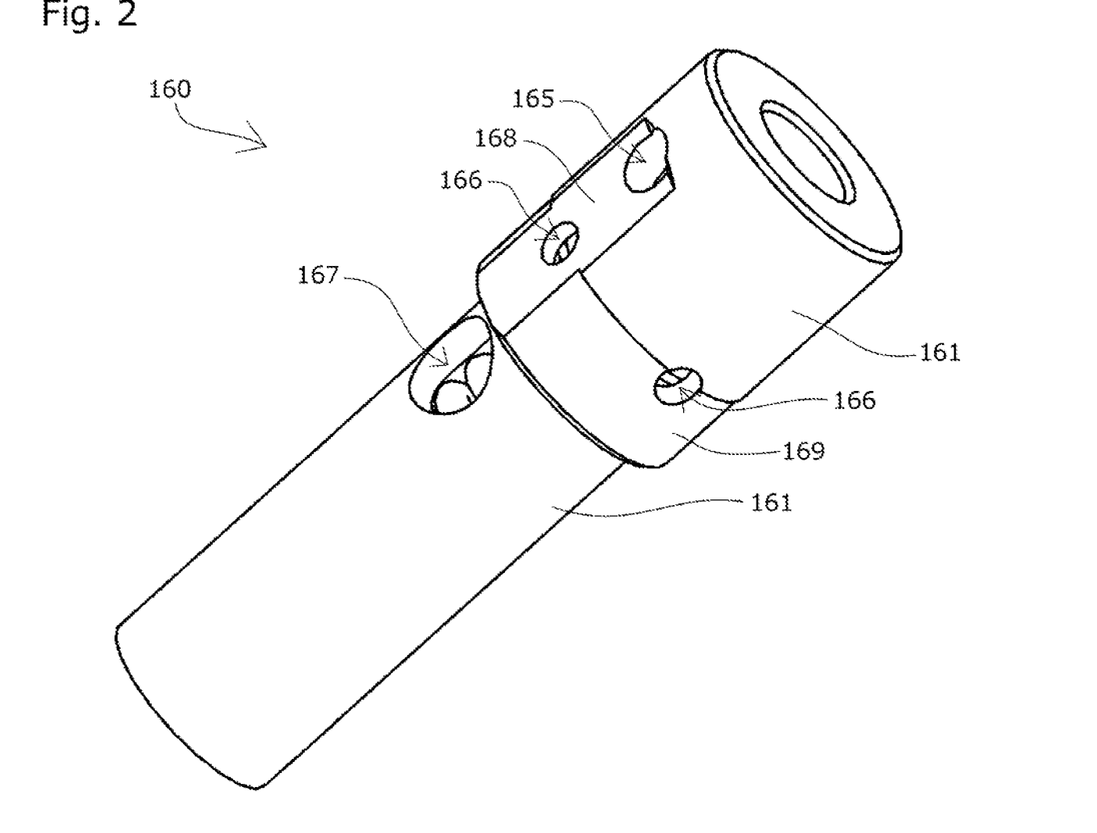
FIG. 2 is a perspective view of a relief valve unit according to one embodiment of the present invention.
Figure 3:
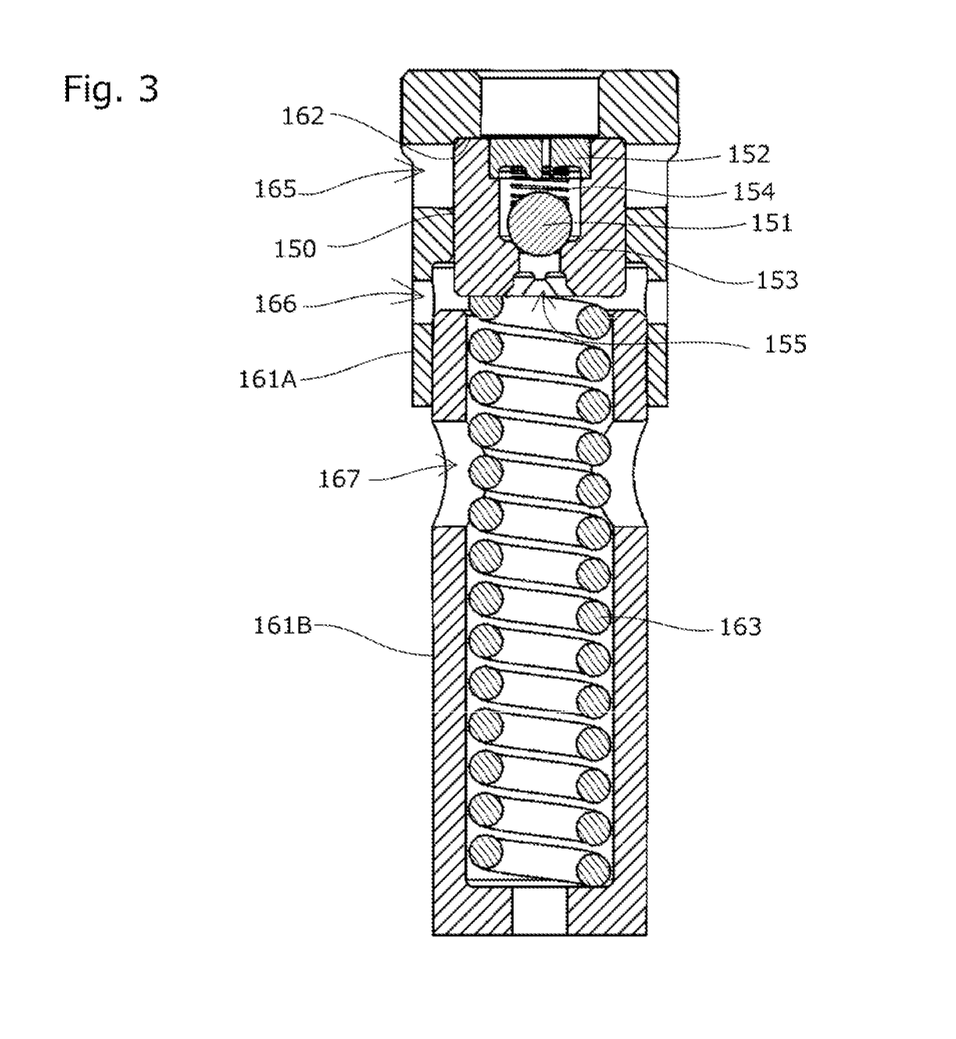
FIG. 3 is a cross-sectional view of the relief valve unit according to one embodiment of the present invention.

The relief valve unit 160 includes, as shown in FIG. 2 and FIG. 3, the relief sleeve 161 in which a check valve unit 150 is slidably inserted, a relief valve seat 162 that opens and closes as the check valve unit 150 slides, and a unit pressing spring 163 that presses the check valve unit 150 toward the relief valve seat 162.

In this embodiment, the relief sleeve 161 is made up of two parts, an upper part and a lower part, and configured to contain the unit pressing spring 163 inside. The lower relief sleeve 161B with a smaller diameter than that of the upper relief sleeve 161A is fitted into the upper relief sleeve 161A having the relief valve seat 162.

The upper relief sleeve 161A includes, on the rear side of the relief valve seat 162, a release hole 165 that is an opening for letting the oil to flow out to the outer circumferential surface of the relief sleeve 161 when the oil is released at a pressure of a predetermined high level or more. A release passage 168 is formed below the release hole 165 for letting the released oil flow downward.

An outer circumferential passage 169 is formed in a lower part on the outer circumference of the upper relief sleeve 161A for letting the released oil to flow circumferentially.

Sleeve communication holes 166 are formed in the release passage 168 and outer circumferential passage 169 of the upper relief sleeve 161A for allowing the oil to flow in and around the check valve unit 150 contained inside.

Figure 4:
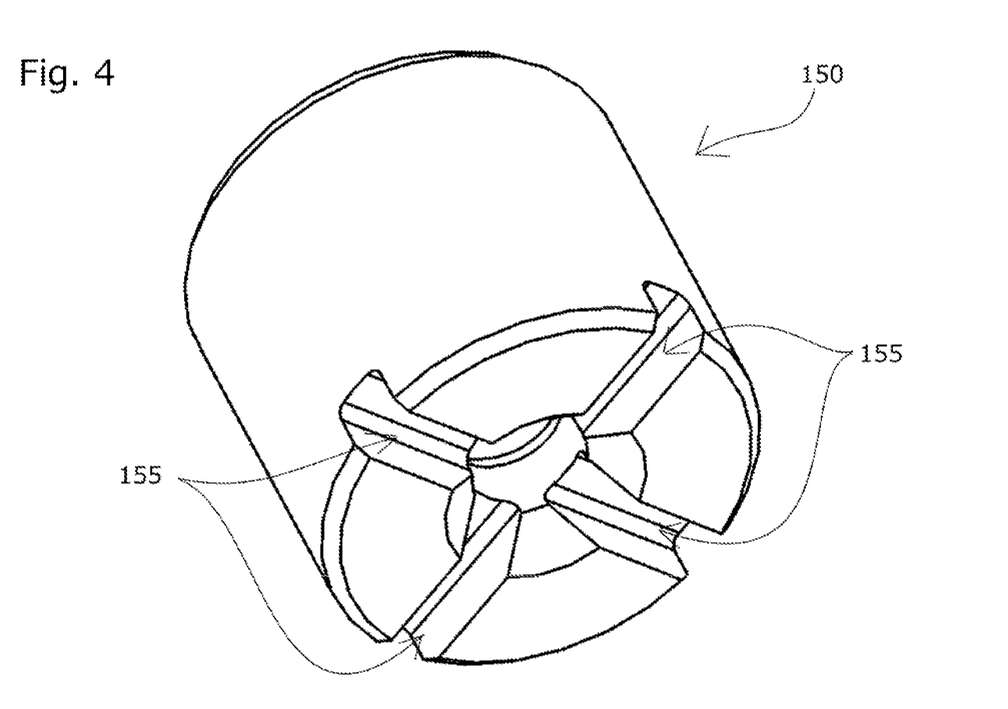
FIG. 4 is a perspective view of a check valve unit according to one embodiment of the present invention.

The check valve unit 150 includes, as shown in FIG. 3 and FIG. 4, a check ball 151, a check valve seat 153 that opens and closes as the check ball 151 sits thereon and separates therefrom, a retainer 152 holding the check ball 151 inside the check valve unit 150, and a ball pressing spring 154 that lightly presses the check ball 151 toward the check valve seat 153.

The check valve unit 150 has a cylindrical outer shape and is configured such that an end face on the opposite side from the unit pressing spring 163 sits on the relief valve seat 162 of the relief valve unit 160.

Oil passage grooves 155 that are oil passages are formed radially in an end face of the check valve unit 150 on the unit pressing spring 163 side.

While radial oil passage grooves 155 extending radially in four directions are provided as oil passages in this embodiment, the grooves may extend in any direction, and may have varying groove width.

Alternatively, the passages may be through holes that extend from outside of the check valve seat 153 to a seat portion below the check ball 151.

In this embodiment, the check valve seat 153 is formed cylindrical to contain the check ball 151 inside and define the outer shape of the relief valve unit 160, with the retainer 152 closing the recess in the check valve seat 153 to retain the check ball 151. Alternatively, the retainer 152 may be formed cylindrical to contain the check ball 151 inside and define the outer shape of the relief valve unit 160, with the check valve seat 153 closing the recess in the retainer 152 to retain the check ball 151. Or, the check valve seat 153 and retainer 152 may both be cylindrical and joined together to define the outer shape of the relief valve unit 160.

How the tensioner 100 and relief valve unit 160 according to one embodiment of the present invention configured as described above operate will now be explained.

Oil is supplied from an oil supply hole 114 below the unit pressing spring 163 inside the relief sleeve 161, through hole 167, into the oil reservoir chamber 123.

When the plunger 120 moves outward, the volume of the oil pressure chamber 101 is increased, so that the check ball 151 is pushed up from the check valve seat 153 to allow the oil inside the oil reservoir chamber 123 to flow into the oil pressure chamber 101.

When the plunger 120 is pressed in to retract, the pressure inside the oil pressure chamber 101 rises, whereby the check ball 151 is pressed against the check valve seat 153, and the oil is stopped from flowing out of the check valve unit 150. The pressure then acts to press the check valve unit 150 itself downward against the pressing force of the unit pressing spring 163.

When the pressure inside the oil pressure chamber 101 reaches or exceeds a predetermined high pressure, the unit pressing spring 163 is compressed and the entire check valve unit 150 retracts, which causes the check valve seat 153 to separate from the relief valve seat 162 of the relief valve unit 160, thus relieving the pressure inside the oil pressure chamber 101.

In this embodiment, as shown, the relief valve seat 162 is formed in a concave shape, and closed by the check valve unit 150 that fits therein to a predetermined depth. That is, with this structure, the pressure of the oil pressure chamber 101 is released after the check valve unit 150 has retracted until it is disengaged, which means that pressure leakage when the valve is closed is minimized.

When the pressure inside the oil pressure chamber 101 suddenly rises to or exceeds a predetermined high pressure, the contact pressure between the check ball 151 and the check valve seat 153 will increase rapidly.

If the pressure suddenly rises to or exceeds a predetermined high level in a state where the check ball 151 is not in contact with the check valve seat 153, the check ball 151 will collide against the check valve seat 153.

Since the check valve seat 153 retracts at this time, the impact caused by a sudden increase in the contact pressure or collision between the check ball 151 and the check valve seat 153 can be mitigated, so that deterioration of the check valve function due to damage to the check ball or check valve seat can be prevented.

Also, since the relief valve unit 160 is integral with the check valve unit 150 as shown in FIG. 2 and FIG. 3, and can be prepared in advance as a single component, the number of parts of the tensioner body 110 or the plunger 120 that need to be processed, and the number of steps of assembling the tensioner 100 can be greatly reduced.

As the check valve unit 150 separates from the relief valve seat 162 to relieve the pressure inside the oil pressure chamber 101, the oil flows out of the oil pressure chamber 101 through the release hole 165 to the outer circumferential surface of the relief sleeve 161.

The released oil is recovered via a short route and with a smaller flow resistance, through the sleeve communication holes 166 provided in the release passage 168 and outer circumferential passage 169 directly below the release hole 165, and the oil passage grooves 155 radially formed in the end face of the check valve seat 153 on the unit pressing spring 163 side, to the inner space of the unit pressing spring 163 directly below the check ball 151.

When the pressure of the oil pressure chamber 101 reduces to or below a predetermined level, the check valve unit 150 is again moved by the unit pressing spring 163 and sits on the relief valve seat 162, to keep the closed state and to maintain the pressure inside.

Since the pressure is relieved by the relief valve unit 160 toward the side from which the oil is supplied from the oil supply hole 114 in this structure, the pressure difference between the oil pressure chamber and the pressure relief side is smaller as compared to conventional structures wherein the pressure is relieved to the outside with a relief valve, and therefore the speed at which the relief valve unit 160 returns to its closed state is increased.

Embodiment 2

A tensioner 200 and a relief valve unit 260 according to another embodiment of the present invention will be described with reference to the drawings.

Figure 5A:
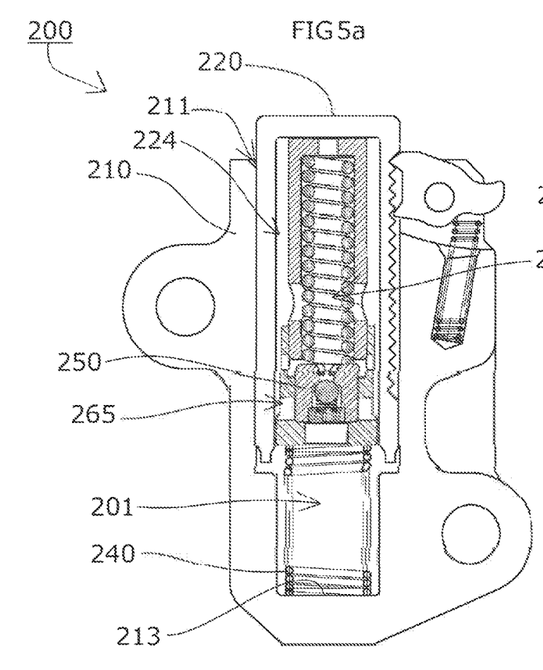
FIG. 5A is a cross-sectional front view of the tensioner according to another embodiment of the present invention.
Figure 5B:
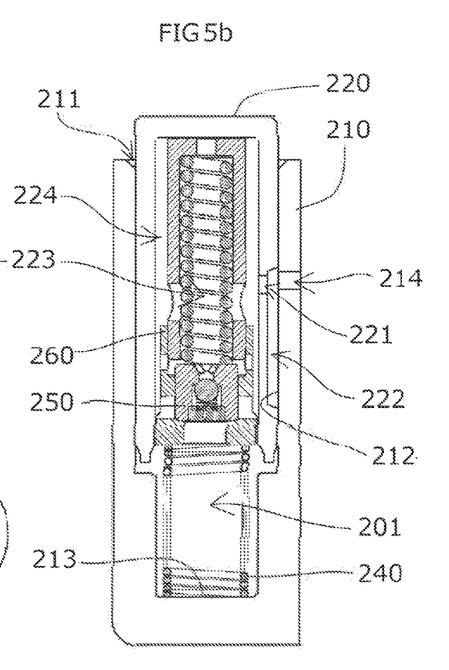
FIG. 5B is a cross-sectional side view of the tensioner according to another embodiment of the present invention.

As shown in FIG. 5A and FIG. 5B, the plunger 220 of the tensioner 200 includes an oil reservoir chamber 223 inside, which communicates with an oil supply hole 214 via a supply passage 222 and a plunger supply hole 221. A relief valve unit 260 is disposed inside the oil reservoir chamber 223. An oil passage 224 is formed between the outer circumference of the relief sleeve and the inner circumference of the plunger 220 for the released oil to circulate back into the oil reservoir chamber 223.

The relief valve unit 260, which is the same as the relief valve unit 160 according to the first embodiment, is used upside down (with the hundreds digit of reference numeral being 2).

A coil spring 240, which is a biasing means that biases the plunger 220 outward, has one end received by the bottom 213 of the plunger bore 211 of the tensioner body 210 to apply a pressing force. An oil pressure chamber 201 is formed on the bottom 213 side.

The tensioner 200 according to this embodiment is also a type known as a ratchet tensioner. The ratchet mechanism may have any known structure and operate as known, and the tensioner need not necessarily be a ratchet type, and so it will not be described in detail.

The tensioner 200 and relief valve unit 260 according to this embodiment operate similarly to the previously described embodiment except that the oil is supplied from the oil supply hole 214 to the oil reservoir chamber 223 via the supply passage 222, plunger supply hole 221, oil passage 224, and an intermediate recovery hole, and that the positions of the oil reservoir chamber 223 and the oil pressure chamber 201 are inverted.

While specific examples of tensioners according to the present invention have been described in each embodiment above, the tensioner according to the present invention is not limited to these examples, and the shapes, positions, sizes, and positional relationships with each other of various constituent parts may be changed in various manners, or variously combined as required.

In each of the embodiments described above, illustrations in which the plunger protrudes upwards were used and the plunger was described as protruding in this direction, but the plunger may be arranged to protrude in any direction in accordance with the mode in which it is used.

It is preferable, in particular, to dispose the tensioner such that the oil reservoir chamber is located higher than the check valve. The relief valve will then be located higher than the oil pressure chamber and the tensioner can have enhanced robustness with respect to air leak possibilities.

The tensioner of the present invention may not necessarily be applied to a chain guide mechanism that uses a guide shoe for slidably guiding a drive chain such as an endless roller chain passing over respective sprockets of a crankshaft and a cam shaft in an engine room, but may also be adopted in applications where the chain is slidably guided directly by the distal end of the plunger.

The tensioner may not necessarily be applied to a chain transmission mechanism but also used for similar transmission mechanisms that use belts, ropes and the like, and can be applied in a variety of industrial fields.

What is claimed is:

1. A tensioner comprising:
    a tensioner body having a cylindrical plunger bore with an open end;
    a cylindrical plunger slidably inserted in the cylindrical plunger bore;
    a biasing means that is accommodated inside an oil pressure chamber formed inside the cylindrical plunger such as to freely expand and contract, and that biases the cylindrical plunger outward;
    a check valve unit that stops reverse flow of oil flowing into the oil pressure chamber; and
    a relief valve unit that releases oil when pressure inside the oil pressure chamber reaches or exceeds a predetermined high pressure,
    the check valve unit being disposed as a valve element of the relief valve unit,
    the relief valve unit including a relief sleeve in which the check valve unit is slidably inserted, a relief valve seat that opens and closes as the check valve unit slides, and a unit pressing spring that presses the check valve unit toward the relief valve seat, and
    the check valve unit including an oil passage for allowing oil to flow from an outer side to an inner side of the check valve unit,
    wherein the oil passage includes an oil passage groove formed radially in an end face of the check valve unit on the unit pressing spring side.

2. The tensioner according to claim 1, wherein the relief valve unit includes a sleeve communication hole that allows oil to flow between outer sides of the relief valve unit and the check valve unit.

3. A relief valve unit incorporated in a tensioner, comprising:
    a relief sleeve in which a check valve unit is slidably inserted;
    a relief valve seat that opens and closes as the check valve unit slides; and a unit pressing spring that presses the check valve unit toward the relief valve seat, the check valve unit including an oil passage for allowing oil to flow between an inner side and an outer side of the check valve unit, wherein the oil passage includes an oil passage groove formed radially in an end face of the check valve unit on the unit pressing spring side.

4. The relief valve unit according to claim 3, further comprising a sleeve communication hole that allows oil to flow between outer sides of the relief valve unit and the check valve unit.

\* \* \* \* \*